United States Patent
Potanin et al.

(10) Patent No.: US 7,336,464 B1
(45) Date of Patent: Feb. 26, 2008

(54) POWER LIMITING CIRCUIT

(75) Inventors: Vladislav Potanin, San Jose, CA (US); Elena Potanina, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 405 days.

(21) Appl. No.: 10/652,990

(22) Filed: Aug. 28, 2003

(51) Int. Cl.
*H02H 5/04* (2006.01)

(52) U.S. Cl. ...................... 361/103; 361/93.8

(58) Field of Classification Search .......... 361/18, 361/103, 104, 105, 91.1, 93.7–93.9, 111, 361/87
See application file for complete search history.

(56) References Cited

U.S. PATENT DOCUMENTS

| | | | | |
|---|---|---|---|---|
| 3,723,774 A | * | 3/1973 | Rogers | 361/101 |
| 4,469,082 A | * | 9/1984 | Nishitoba et al. | 123/609 |
| 4,800,331 A | * | 1/1989 | Vesce et al. | 323/277 |
| 4,937,697 A | * | 6/1990 | Edwards et al. | 361/18 |
| 5,640,059 A | * | 6/1997 | Kammiller et al. | 307/66 |
| 6,052,268 A | * | 4/2000 | Thomas | 361/103 |
| 6,229,283 B1 | * | 5/2001 | Kalogeropoulus et al. | 320/125 |
| 6,414,832 B1 | * | 7/2002 | Crecelius et al. | 361/120 |
| 6,433,556 B1 | * | 8/2002 | Smith | 324/546 |
| 6,630,748 B2 | * | 10/2003 | Sato et al. | 307/10.1 |
| 6,667,606 B2 | * | 12/2003 | Oglesbee et al. | 323/284 |
| 6,987,655 B2 | * | 1/2006 | Kesler et al. | 361/103 |

* cited by examiner

*Primary Examiner*—Michael Sherry
*Assistant Examiner*—Danny Nguyen

(57) ABSTRACT

A power limiting circuit is disclosed. The power limiting circuit includes a temperature sensing circuit that outputs a temperature signal that is proportional to temperature over a temperature range. The power limiting circuit also includes a regulation circuit coupled to the temperature sensing circuit and controlled by the temperature signal. The regulation circuit operates in a manner that is proportional to the temperature.

11 Claims, 5 Drawing Sheets ure, according to embodiments of the present invention.

POWER LIMITING CIRCUIT

RELATED CASE

This application is related to co-pending, commonly-owned U.S. patent application Ser. No. 10/652,991, filed Aug. 28, 2003, entitled "Method and System for Charge Current Control" to Potanin et al.

TECHNICAL FIELD

The present invention generally pertains to the field of electronic circuits. More particularly, embodiments of the present invention are related to a circuit for limiting power.

BACKGROUND ART

Many electronic circuits have a need for thermal protection. Without thermal protection, the electronic circuit or nearby components can be damaged, or at least rendered less efficient. Voltage regulators and battery chargers are two examples of circuits needing thermal protection, although many other circuits also need thermal protection. In the case of a battery charging circuit, overheating can damage the battery and even lead to risk of the battery exploding. Without a thermal protection circuit, overheating can easily happen due to the charging current passing through elements having some resistance. For example, battery chargers often have power pass devices that generate significant heat when passing the charging current. In some cases, the power pass devices are constructed external to the integrated circuit containing the rest of the circuit to reduce the heating problem. However, this complicates the circuit design and increases manufacturing expense. Moreover, other circuit elements on the integrated circuit also dissipate heat.

One technique for thermal protection is to measure the temperature on the integrated circuit die or at another significant location and shut down the circuit if the temperature gets too high. Once the temperature has returned to below a safe limit, the power to the circuit is abruptly switched back on. Unfortunately, turning the circuit off and on causes "bounce", which stresses the integrated circuit.

Thus, a need exists for a thermal protection circuit for an electronic circuit. A still further need exists for a thermal protection circuit that does not cause unnecessary stress to the power delivery system it protects. A still further need exists for a thermal protection circuit that is compatible with and can be fabricated economically with existing semiconductor fabrication techniques.

SUMMARY

The present invention provides a thermal protection circuit for an electronic circuit. Embodiments of the present invention provide a thermal protection circuit that does not cause unnecessary stress to the power delivery systems they protect. Embodiments of the present invention provide thermal protection circuits that are compatible with and can be fabricated economically with existing semiconductor fabrication techniques.

A power limiting circuit is disclosed. In one embodiment in accordance with the present invention, the power limiting circuit comprises a temperature sensing circuit that outputs a temperature signal that is proportional to temperature over a temperature range. The power limiting circuit also comprises a regulation circuit coupled to the temperature sensing circuit and controlled by the temperature signal. The regulation circuit operates in a manner that is proportional to the temperature.

In another embodiment of the present invention the power limiting circuit comprises a temperature sensing circuit that outputs a temperature signal that is proportional to temperature over a temperature range. The power limiting circuit further comprises a circuit that senses a current and outputs a feedback signal based thereon. The power limiting circuit also includes a circuit that inputs the temperature signal and the feedback signal and outputs a control signal based on the temperature signal and the feedback signal. Further, the power limiting circuit further comprises a power pass circuit controlled by the control signal and outputting a power signal, wherein the power signal is regulated based on the temperature signal.

These and other advantages of the present invention will no doubt become obvious to those of ordinary skill in the art after having read the following detailed description of the preferred embodiments which are illustrated in the various drawing figures.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Unlike conventional systems for providing thermal protection, embodiments of the present invention do not abruptly turn off the circuit in response to a temperature being monitored being too high. Rather, embodiments of the present invention gradually reduce current in the circuit. The reduction in current leads to reduction in power dissipation, and thus temperature is reduced. Moreover, unlike conventional systems for providing thermal protection, embodiments of the present invention do not abruptly turn back on the circuit after the temperature returns to below a safe limit. Rather, embodiments of the present invention gradually increase current in the circuit if the temperature is below a safe operating temperature, allowing additional power to be safely dissipated. Thus, embodiments of the present invention smoothly and gradually increase or decrease the current in the circuit in response to the monitored temperature. In contrast, conventional thermal protection circuits cause the circuit to bounce between extremes of the circuit being on or off. Thus, embodiments of the present invention reduce stress to the circuit.

Figure 1:
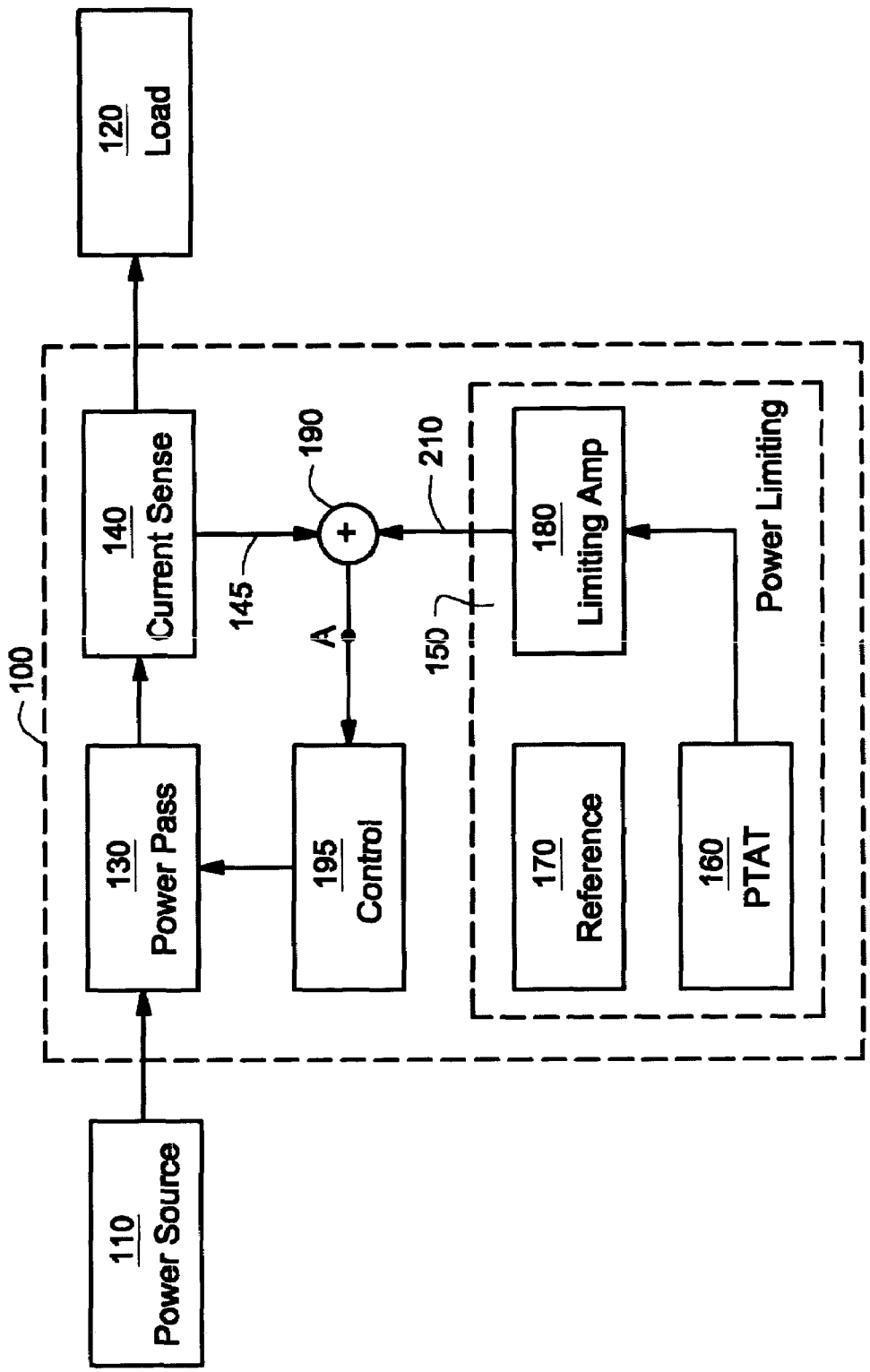
FIG. 1 is a block diagram of a system for limiting power, according to an embodiment of the present invention.

FIG. 1 is a block diagram including a power limiting system 100, according to an embodiment of the present invention. The power limiting system 100 is coupled to a power source 110 and a load 120. The overall function of the power limiting system 100 is to deliver power from the power source 110 to the load 120 in a controlled manner. The power limiting system 100 comprises a power pass 130 that passes power from the power source 110 to the load 120 via the current sense 140. The current sense 140 measures the amount of current being delivered to the load 120 and delivers a feedback signal 145. The feedback signal 145 is used in the process of controlling the power pass 130. The power limiting system 100 also has a control circuit 195 that controls the power pass circuit 130 in order to limit the power delivered to the load 120.

Still referring to FIG. 1, the power limiting system 100 also has a power limiting circuit 150 that is used in the process of controlling the power pass 130. The power limiting circuit 150 outputs a temperature signal 210 that is proportional to a sensed temperature over a temperature range. The temperature signal 210 is used along with the feedback signal to control the power pass 130 such that the current in the circuit is smoothly and gradually increased or decreased in response to a monitored temperature. The power limiting circuit 150 will be discussed in more detail below. To control the power pass 130, the temperature signal 210 is added to the feedback signal 145 by the adder 190. The output of the adder 190 is input to the control circuit 195. Thus, the power limiting system 100 limits the power delivered to the load 120 based on the temperature.

Referring still to FIG. 1, the temperature signal 210 is generated by the power limiting system 150 as follows. A PTAT (Proportional To Absolute Temperature) circuit 160 outputs a signal that is proportional to the absolute temperature. This signal is fed into a limiting amplifier 180, along with a reference signal that is independent of temperature. The limiting amplifier 180 outputs the temperature signal 210.

Still referring to FIG. 1, the power limiting system 100 is designed to operate such that the voltage at node A at the output of the adder 190 remains constant. The voltage at node A is a function of the feedback signal 145 and the temperature signal 210. Thus, to decrease the amount of power delivered to the load 120, the power limiting circuit 150 increases the temperature signal 210 to reduce the amount of power that is passed. A lower power passed means the feedback current 145 will be lower such that the voltage at node A remains constant. Alternatively, if the amount of power delivered to the load 120 is to be increased, the power limiting circuit 150 reduces the temperature signal 210, which increases the amount of power that is passed. This, in turn, increases the feedback current 145 such that the voltage at node A remains constant. Significantly, the increase or decrease in the temperature signal 210 is gradual.

Figure 2:
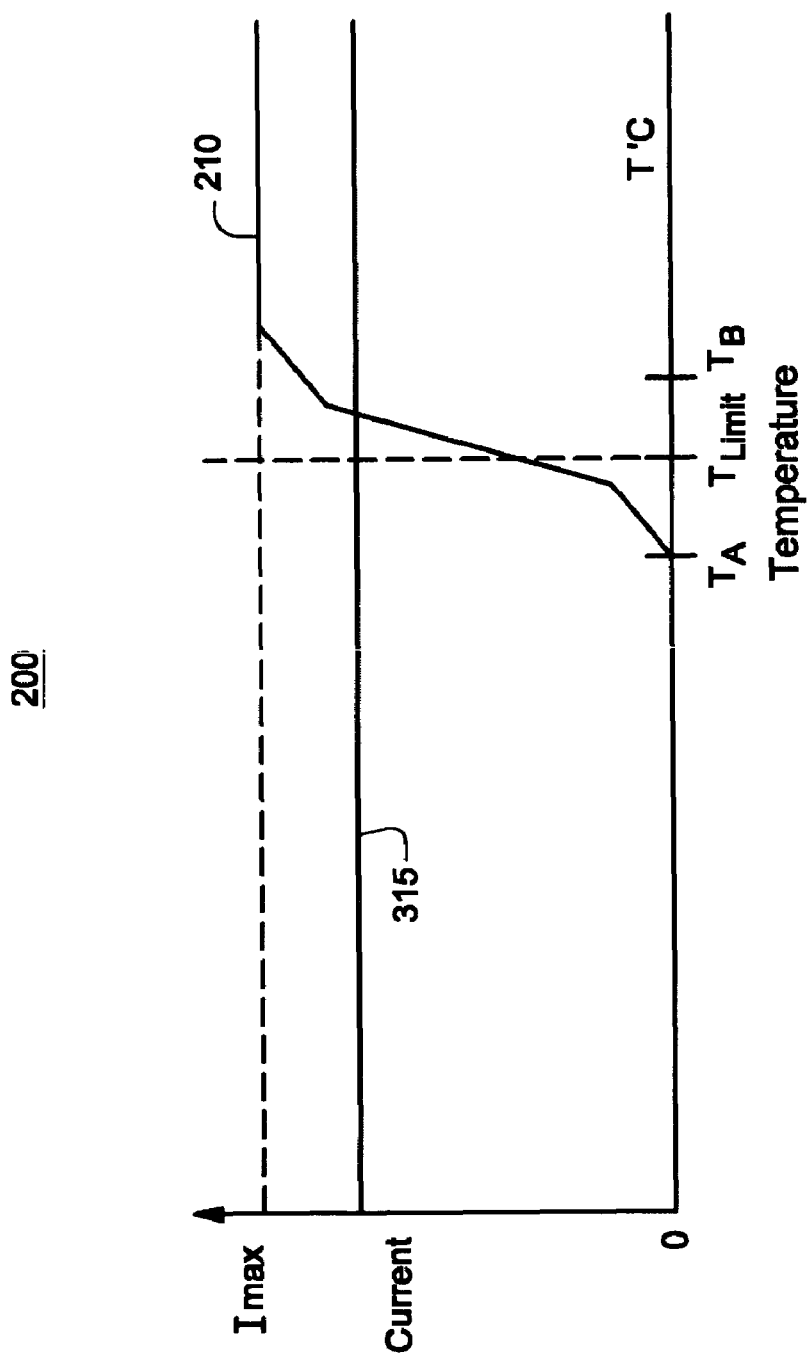
FIG. 2 is a graph of a temperature signal versus temperature, according to embodiments of the present invention.

Characteristics of an exemplary temperature signal 210 will now be discussed. FIG. 2 is a graph 200 of an exemplary temperature signal 210 versus temperature, according to embodiments of the present invention. When the temperature is below $T_A$, the temperature signal 210 is essentially zero. When the temperature is above $T_B$, the temperature signal 210 is at its upper limit. Between a temperature of $T_A$ and $T_B$, the temperature signal 210 increases gradually. Thus, the temperature signal 210 is proportional to a sensed temperature over a temperature range (e.g., between temperature $T_A$ and $T_B$. As will be discussed in further detail below, when the temperature signal 210 is at its maximum, it causes the power pass (FIG. 1, 130) to shut down. When the temperature signal 210 is at its minimum, it does not limit the power pass. As the temperature signal 210 moves from its maximum towards its minimum, it causes the power pass to gradually decrease the amount of power supplied to the load. As the temperature signal 210 moves from its maximum towards its minimum, it causes the power pass to gradually increase the amount of power supplied to the load. As the temperature signal 210 moves from its minimum towards its maximum, it causes the power pass to gradually decrease the amount of power supplied to the load. Thus, embodiments of the present invention do not have abrupt changes in the amount of power delivered or the current in the circuit being regulated.

Figure 3:
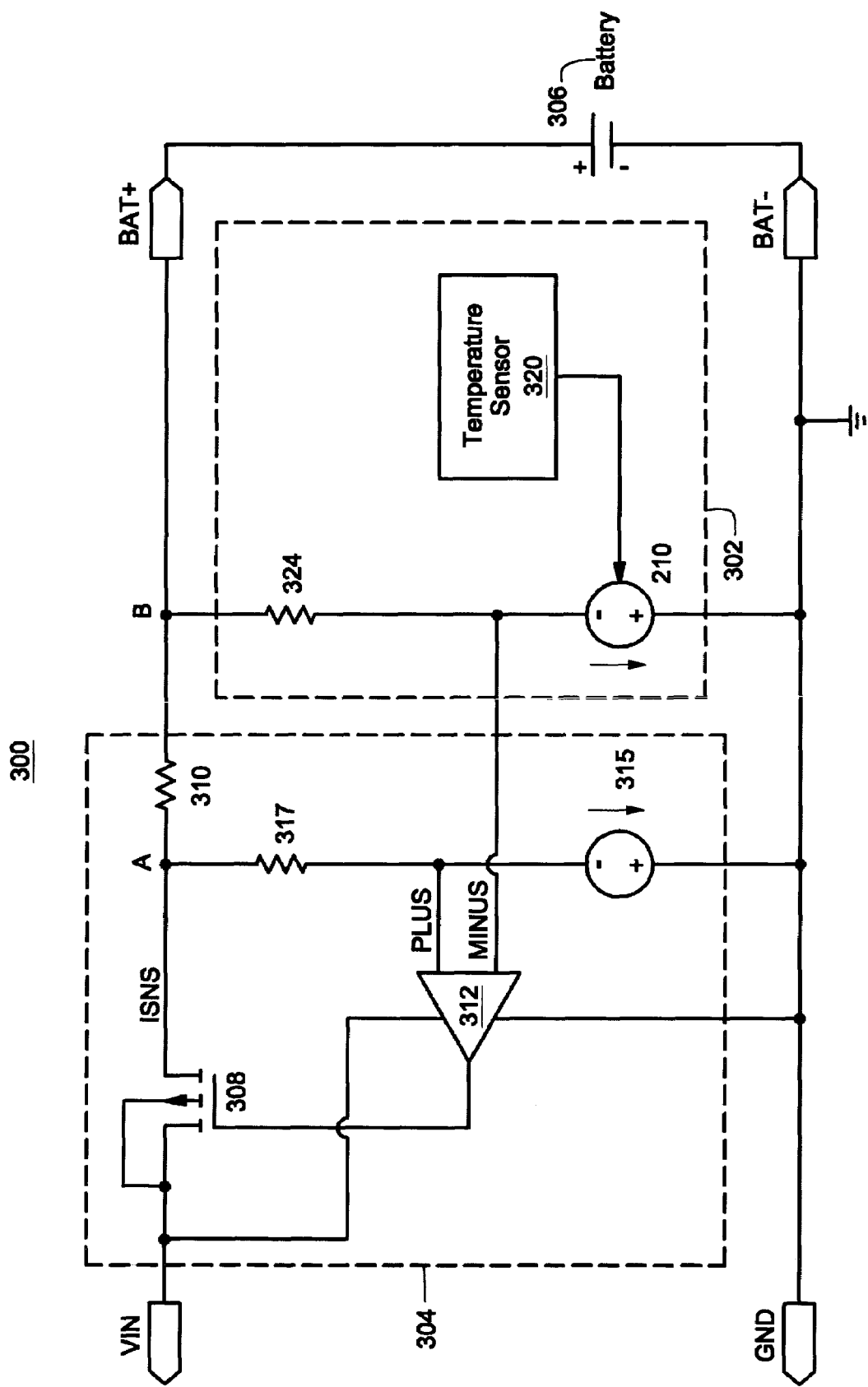
FIG. 3 is a diagram of a circuit for limiting power, according to embodiment of the present invention.

FIG. 3 is a diagram of a circuit 300 for limiting power, according to an embodiment of the present invention. The circuit 300 comprises a control loop 304 and a temperature regulation loop 302. In this embodiment, the load is a battery 306 and the circuit 300 functions as a battery charger. However, it will be understood that the present invention is not limited to battery charging applications. The operation of the control loop 304 will be discussed first. One terminal of the input voltage ($V_{IN}$) is coupled a terminal of a power pass transistor 308. The power pass transistor 308 delivers power to charge the battery 306 via a sense resistor 310. The sense resistor 310 is used to sense the amount of current delivered to the battery 306. The gate terminal of the power pass transistor 308 is coupled to the feedback amplifier 312, which controls the power pass transistor 308. The remaining elements of the control loop 304 are the current setting resistor 317 and a temperature independent current source 315, which together form a current setting circuit. The positive terminal of the feedback amplifier 312 is coupled between the setting resistor 317 and the temperature independent current source 315.

The temperature regulation loop 302 comprises a temperature sensor 320, a temperature signal 210, and a resistor 324. The temperature signal 210 is controlled by the temperature sensor 320. Thus, the temperature signal 210 is a controllable current source in this embodiment. The temperature signal 210 has a current versus temperature curve such as the exemplary curve in FIG. 2, in accordance with embodiments of the present invention. However, it will be understood that the curve in FIG. 2 is only an example. Referring again to FIG. 2, the temperature sensor circuit 320 is designed such that temperature signal 210 does not provide any current when the temperature being monitored is below a predetermined limit. For example, this is below temperature $T_A$ in FIG. 2. FIG. 2 also contains a curve for temperature independent current source 315. The magnitude of the temperature signal 210 is slightly less than the magnitude of the temperature independent current 315 at a temperature of $T_{LIMIT}$. At a temperature just above $T_{LIMIT}$, the magnitude of the temperature signal 210 and the temperature independent current 315 are the same. Above that temperature, the magnitude of the temperature signal 210 is greater than the magnitude of the temperature independent current 315. The magnitude of the temperature independent current 315 to the temperature signal 210 affects the amount of power delivered, as will be discussed more fully below.

In one embodiment in accordance with the invention, all of the components of the control loop 304 and the temperature regulation loop 302 are implemented on a single integrated circuit die. In another embodiment in accordance with the invention, the power pass transistor 308 is implemented external to the integrated circuit die that contains the rest of the components of circuit 300. In still another embodiment in accordance with the invention, the sense resistor 310 is implemented external to the integrated circuit die containing the rest of the components of circuit 300. In yet another embodiment in accordance with the invention, both the power pass transistor 308 and the sense resistor 310 are implemented external to the integrated circuit die containing the rest of the components of circuit 300.

The operation of circuit 300 of FIG. 3 will now be discussed in greater detail. Consider the case when the initial conditions are such that the voltage $V_{IN}$ is higher than the voltage at the positive terminal of the battery 306 and the temperature is below a predetermined limit. In this case, the current control loop 304 regulates the current ($I_{chrg}$) that flows to the positive terminal of the battery 306 to a value the may be expressed as in Equation 1.

$$I_{chrg}=I_{315}*R_{317}/R_{310} \quad \text{Equation 1:}$$

In this case, there is no voltage drop across the resistor 324 in the temperature regulation loop 302 because the temperature signal 210 provides no current under the stated condition of the temperature being below the predetermined limit. Now, the operation of the control loop 304 will be examined under the stated conditions. In particular, the control of the power pass transistor 308 will be examined. Suppose that the power pass transistor 308 is open, such that the sense current in the sense resistor 310 is zero. The setting current 315 causes a voltage drop across the setting resistor 317 and the sense resistor 310. Thus, the voltage at the positive input of the feedback amplifier 312 must be greater than the voltage at the negative input of the feedback amplifier 312 since there is no voltage drop across the resistor 324 in the temperature regulation loop 302 under the stated condition of the temperature being under the predetermined limit.

When the positive input of the feedback amplifier 312 is at a lower voltage than the negative input is at, the feedback amplifier 312 drives down the voltage at the gate of the power pass transistor 308, thus turning on the power pass transistor 308 and increasing its conductivity. Therefore, a charging current flows through sense resistor 310 and the battery 306 is charged. Moreover, the charging current causes the voltage to drop across the sense resistor 310 from node A to node B. Eventually, the voltage drop across the sense resistor 310 from node A to node B is equal to the voltage drop across the setting resistor 317 from node A to the positive inputs of the feedback amplifier 312. Since, there is no voltage drop across resistor 324 in the temperature regulation loop 302 under the stated condition of the temperature being under the predetermined limit, the voltages at the positive and negative inputs of the feedback amplifier 312 become equal. Thus, the circuit 300 is in equilibrium, as the positive and negative inputs of the feedback amplifier 312 are now equal.

Now the operation of the circuit 300 will be discussed under a condition in which the die temperature exceeds the predetermined limit. This may occur, for example, due to power dissipated in the power pass transistor 308 and/or the sense resistor 310 as a result of the charge current. However, other elements may also contribute to the increase in die temperature. Referring briefly to FIG. 2, assume the temperature is initially below $T_{LIMIT}$ and then rises to just above $T_{LIMIT}$. Under this condition, the rising temperature causes the temperature sensor to increase the magnitude of the temperature signal 210, as illustrated in FIG. 2.

Referring again to FIG. 3, the current that now flows in the temperature signal 210 causes a voltage drop across resistor 324 in the temperature regulation loop 302 such that the voltage at the negative input of the feedback amplifier 312 will drop. Thus, the negative input of the feedback amplifier 312 decreases relative to the positive input of the feedback amplifier 312. This change in differential voltage will cause the output of the feedback amplifier 312 to increase, thus increasing the voltage at the gate terminal of the power pass transistor 308. The increase in the voltage at the gate terminal of the power pass transistor 308 decreases the conductivity of the power pass transistor 308, thus reducing the charge current to the battery 306 through sense resistor 310. The decrease in the charge current causes a decrease in power dissipated. Eventually, the circuit 300 will balance at an operation point that is near the temperature limit ($T_{LIMIT}$) of FIG. 2. At this operation point, the charge current is such that the heat created in the power pass transistor 308 and the sense resistor 310 is dissipated through the die package such that the temperature stabilizes.

Figure 4:
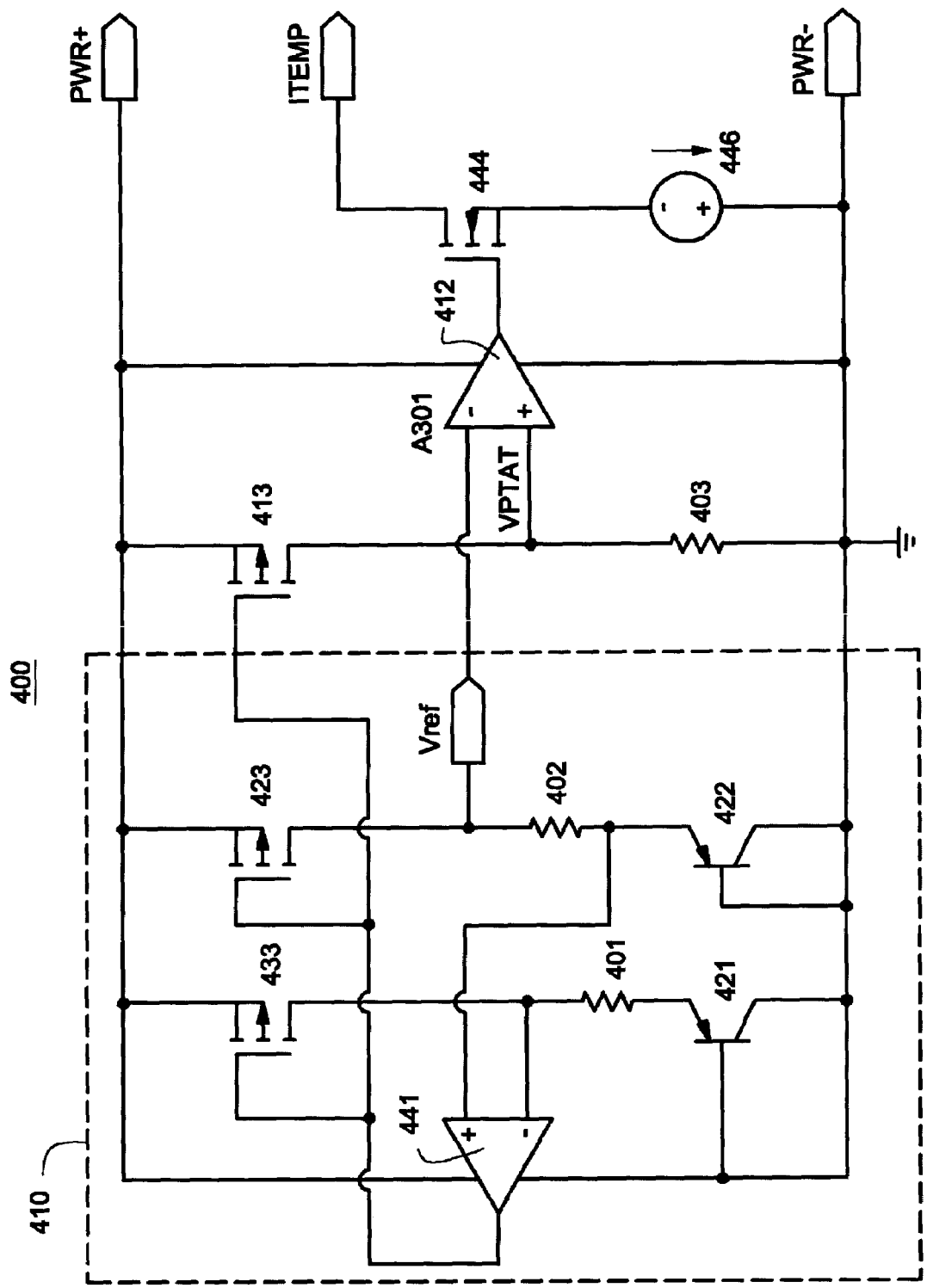
FIG. 4 is a diagram of a circuit for sensing temperature, according to embodiment of the present invention.

FIG. 4 is a diagram of an exemplary temperature sensing circuit 400, according to an embodiment of the present invention. The exemplary temperature sensing circuit 400 may be used to implement the temperature sensor 320 and the temperature signal 210 of the temperature regulation loop 302 in circuit 300 of FIG. 3. However, the present invention is not limited to using the exemplary temperature sensing circuit 400.

The exemplary temperature sensing circuit 400 comprises a bandgap reference voltage circuit 410, which outputs a voltage reference ($V_{REF}$) to the negative input of amplifier 412. The voltage reference ($V_{REF}$) is proportional to absolute temperature, as can be seen from Equation 2.

$$V_{REF}=V_{be2}+R_{402}/R_{401}*(kT/q)*\ln(A1/A2) \quad \text{Equation 2:}$$

The second term in Equation 2 has a positive temperature coefficient. Consequently, the current ($I_{402}$) through resistor 402 is proportional to temperature and can be expressed as in Equation 3.

$$I_{402}=(kT/q)*\ln(A1/A2)/R_{401} \quad \text{Equation 3:}$$

The positive input of amplifier 441 is coupled to the node between resistor 402 and transistor 422. The negative input of amplifier 441 is coupled to the node between resistor 401 and transistor 433. The output of amplifier 441 is coupled to the gates of transistors 413, 413, and 433.

Transistor 413 and resistor 403 serve to mirror the current (1402) that passes through resistor 402 and transistor 423. The current that passes through resistor 402 may also be scaled, if desired, by suitable selections of parameters of current mirror transistors 413 and 423. The value of resistor 403 is selected to achieve the desired temperature limit (e.g., $T_{LIMIT}$ in FIG. 2). An approximate value for resistor 403 can be calculated according to Equation 4, in which "I" is taken from Equation 3.

$$R_{403}=I*[V_{REF}-(T_{LIMIT}-T_{Ambient})*0.004] \quad \text{Equation 4:}$$

In one embodiment in accordance with the present invention, the resistors 401, 402, 403 and the transistors 413, 423, 433 are fabricated as matched devices. Matching the devices facilitates achieving an accurate temperature limit.

Continuing with the discussion of circuit 400, the voltage difference at the inputs of the amplifier 412 between $V_{REF}$ and $V_{PTAT}$ is amplified by the amplifier 412 and supplied to the gate of transistor 444. Transistor 444 controls the value of the current supplied by current source 446. Finally, sinking the current 446 over the terminal ITEMP results in the behavior as illustrated in FIG. 2.

Figure 5:
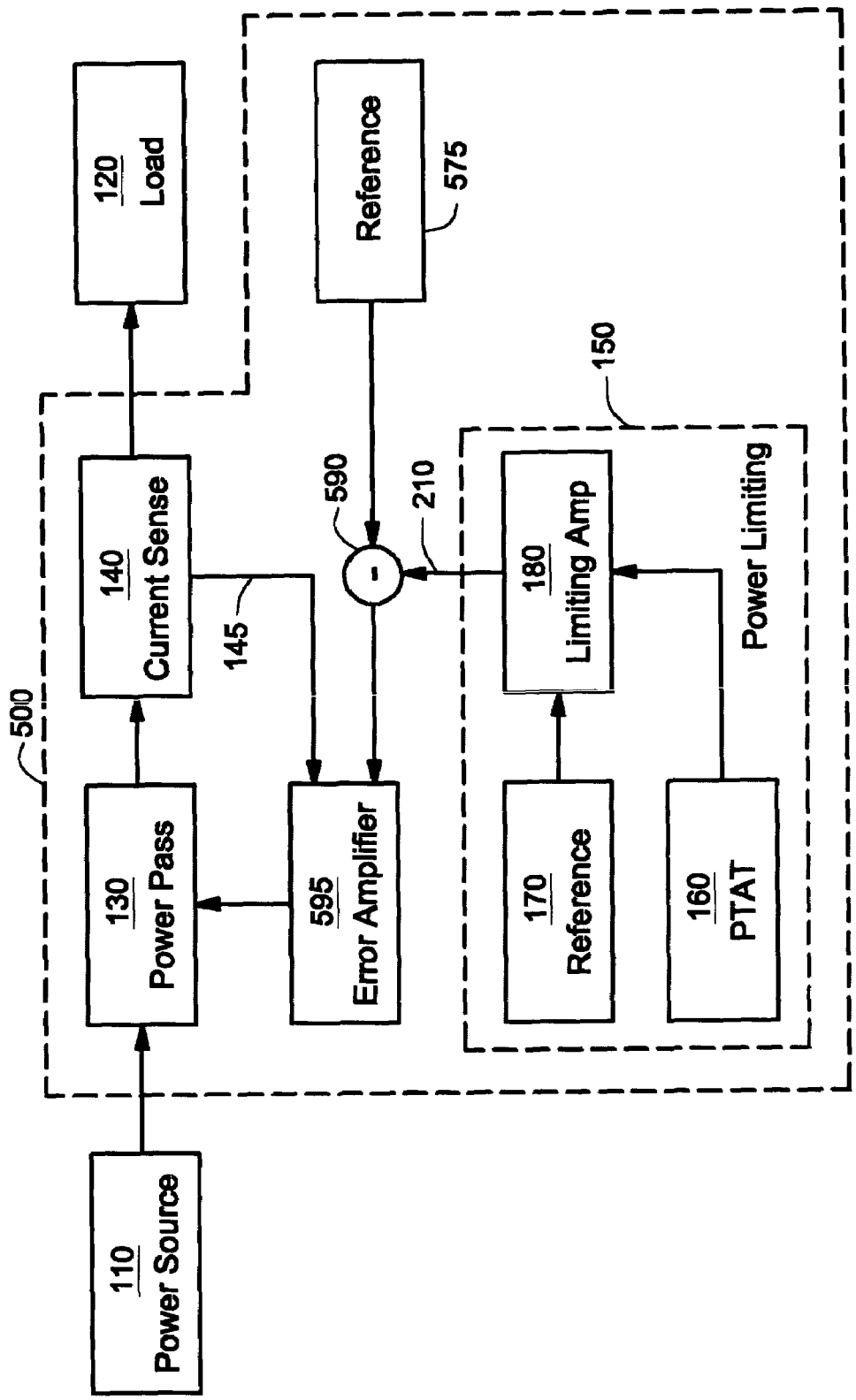
FIG. 5 is a block diagram of a system for limiting power, according to an embodiment of the present invention.

It will be understood that the various circuits and block diagrams illustrated herein are exemplary and that other configurations are suitable to implement embodiments in accordance with the present invention. For example, referring to FIG. 3, the power pass transistor can be implemented between the sense resistor 310 and the positive terminal of the battery 306. FIG. 5 illustrates an embodiment that is similar to FIG. 1, but has differences that may make the system of FIG. 5 more suitable for particular requirements, as those of ordinary skill in the art will appreciate.

FIG. 5 is a block diagram including a system 500 for limiting power, according to an embodiment of the present invention. The overall function of the power limiting system 500 is to deliver power from the power source 110 to the load 120 in a controlled manner. The system 500 of FIG. 5 is similar to the system 100 of FIG. 1 is several ways. Each has a power limiting circuit 150 comprising a limiting amplifier 180, a PTAT 160, and a reference signal generator 170. Moreover, system 500 has a power pass 130 and a current sense 140, as does system 100.

However, instead of adding the temperature sense signal 210 to the feedback signal 145, the system 500 of FIG. 5 subtracts the temperature sense signal 210 from a reference signal supplied by reference signal generator 575. The result of the subtraction, as output by subtractor 590, is input to error amplifier 595, along with the feedback signal 145. The error amplifier 595 controls the power pass 130. Those of ordinary skill in the art will recognize that other possible configurations exist, such as switching the position of the power pass 130 and the current sense 140.

While embodiments of the present invention are compatible with battery charging systems, the present invention is not limited to use in battery charging applications.

Therefore, it will be seen that embodiments of the present invention provide a thermal protection circuit for an electronic circuit. Moreover, embodiments of the present invention provide a thermal protection circuit that does not cause unnecessary stress to the power delivery system it protects. Further, embodiments of the present invention provide a thermal protection circuit that is compatible with and can be fabricated economically with existing semiconductor fabrication techniques.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit comprising:
    a temperature sensing circuit that generates a continuous temperature signal that is proportional to temperature over a temperature range; and
    a regulation circuit coupled to said temperature sensing circuit, said regulation circuit comprising:
        a first circuit that senses a first current and outputs a feedback signal based thereon;
        a variable current source inputting said temperature signal and outputting a second current based on said temperature signal, wherein said second current causes a voltage to be generated; and
        a second circuit inputting said voltage and said feedback signal and outputting a control signal based on said voltage and said feedback signal, wherein said regulation circuit is controlled by said control signal and regulates in a manner that is proportional to said temperature, and wherein further said temperature signal causes said regulation circuit to gradually decrease said current if the temperature is above a pre-determined operating temperature.

2. The circuit of claim 1, wherein said temperature signal is substantially linearly proportional to temperature over said temperature range.

3. The circuit of claim 1, wherein said temperature signal causes said regulation circuit to gradually increase current if the temperature is below a pre-determined operating temperature.

4. The circuit of claim 1, wherein said regulation circuit comprises a power pass circuit outputting a power signal, wherein said power signal is regulated based on said temperature signal.

5. The circuit of claim 1, wherein said circuit is contained on an integrated circuit die.

6. The circuit of claim 5, wherein said power regulation circuit is fabricated on said integrated circuit die.

7. A power regulation circuit comprising:
    a temperature sensing circuit that outputs a continuous temperature signal that is proportional to temperature over a temperature range;
    a first circuit that senses a first current and outputs a feedback signal based thereon;
    a variable current source inputting said temperature signal and outputting a second current based on said temperature signal, wherein said second current causes a voltage to be generated; and
    a second circuit inputting said voltage and said feedback signal and outputting a control signal based on said voltage and said feedback signal; and
    a power pass circuit controlled by said control signal and outputting a power signal, wherein said power signal is regulated based on said temperature signal, and wherein further said temperature signal causes said power pass circuit to gradually decrease said current if the temperature is above a target temperature.

8. The circuit of claim 7, wherein said temperature range contains said target temperature and said temperature signal is continuous over said temperature range.

9. The circuit of claim 8, wherein said temperature signal causes said power pass circuit to gradually increase current if the temperature is below said target temperature.

10. The circuit of claim 7, wherein said circuit is contained on an integrated circuit die.

11. The circuit of claim 10, wherein said power regulation circuit is fabricated on said integrated circuit die.

* * * * *